Patented Dec. 13, 1932

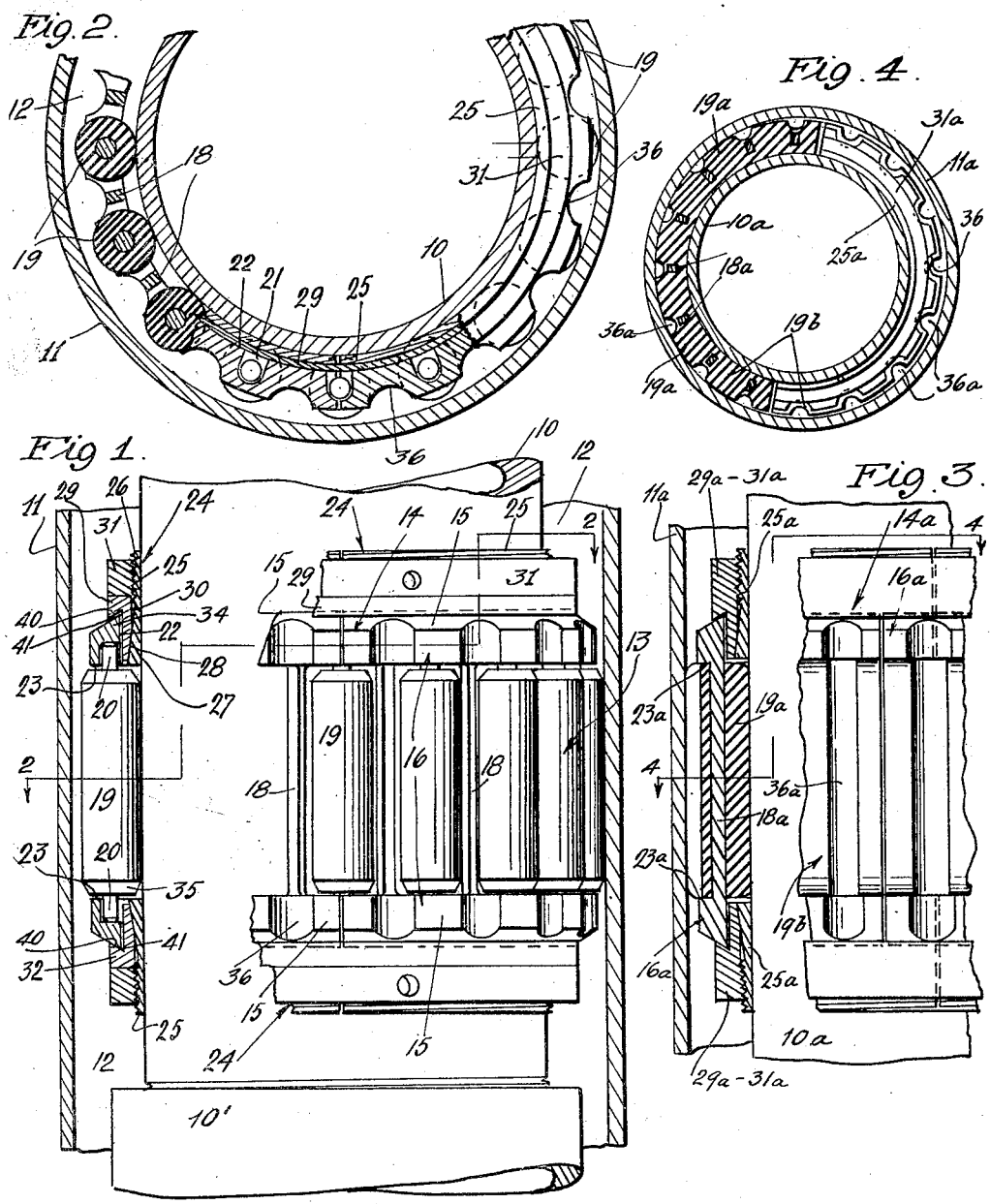

1,890,529

UNITED STATES PATENT OFFICE

JAMES J. SANTIAGO, OF LOS ANGELES, CALIFORNIA, ASSIGNOR TO JOHN GRANT, OF LOS ANGELES, CALIFORNIA

DRILL STEM BEARING

Application filed February 24, 1930. Serial No. 430,609.

This invention has to do generally with the deep well art and is more particularly concerned with devices for protecting well casings, tubing, and the like from abrasive and other damaging effects of drill stems, pump rods, and the like which are movable therethrough.

For purposes of simplicity the description of the invention will be confined to installations on rotary drill stems, but this confinement is not to be considered as in any way limitative on the invention, considered in its broader aspects, for its advantageous application in analogous situations will be self-apparent to those skilled in the art.

It is well known that due to the abrasive and other effects arising from the engagement of unprotected drill stems with casing walls, such walls are frequently battered or worn through, with obvious damaging results. Hence, it has become more or less common practice to provide bearings at relatively frequent intervals along the stem, which bearings are interposed between stem and casing to take the wear incident to stem and casing engagement. It is with such bearings that my invention has to do.

Usual drill stem bearings may be divided roughly into two types. In one type lie bearings made up of rubber sleeves which are "sprung" radially over tool joints or the like into encircling engagement with the stem, depending more or less upon their inherent tendency towards radial contraction to hold them positioned on the stem. A bearing of this type is advantageous in that it is relatively cheap and may be initially installed with comparatively little difficulty, though it is apt to be ruptured during the "springing" operation, but it has the disadvantage of not being freely rotatable about the stem with a consequent tendency to wear unevenly under certain operating conditions. Furthermore, once the sleeve has become unduly worn, a new sleeve can be substituted only after the "stands" of pipe have been broken up into individual pipe sections.

A bearing of the second type may be characterized as one in which a metal sleeve is clamped or otherwise drivingly attached to the stem, with bearing elements mounted for engagement with and bodily rotation about the sleeve, said elements either directly engaging the inner wall of the casing or engaging an outer sleeve encircling said elements, which outer sleeve, in turn, is in peripheral engagement with the inner wall of the casing. This type has the advantage of allowing free bodily rotation of the bearing elements about the stem and therefore avoids the tendency toward uneven wear which is inherent in the first type, but it has the serious disadvantages of being relatively expensive and comparatively difficult to install properly. One reason for this difficulty arises from the fact that the inner sleeve must usually be clamped tightly or otherwise properly attached to the stem at more than one point longitudinally therealong, and this is difficult of accomplishment due to the surface irregularities of commercial pipe and the consequent tendency of the sleeve to become "cocked" on the pipe when the clamping or attaching pressure is applied.

It may be considered as a general object of my invention to provide a bearing having the advantages of the two types characterized above, with none of their disadvantages. In other words, my invention contemplates the use of bearing elements which are directly engageable with but freely bodily rotatable about the stem, while the means employed for maintaining the bearing against movement longitudinally along the stem are such that they may be readily and accurately applied at any point along the stem and irrespective of surface irregularities of the stem. As will be pointed out, these features are present whether the bearing elements be in the form of sleeves or rollers.

Whether the bearing elements be sleeves or rollers, it is preferable that they be made of rubber, for it has been found that rubber elements stand up much better than do metallic elements under the peculiar service conditions obtaining in this particular field. One reason for this is the fact that drilling débris which has a tendency to wear away or chip metallic rollers, simply beds itself in the rubber rollers and has no harmful effect until after long service. However, it will be understood that the invention is not limited to the use of rubber rollers or sleeves, for it will be evident that the novel association of elements to be set up is not limited to the use of bearing elements made up of any particular material.

One of the most serious problems in connection with bearing installations is that of replacement, for most drill stem bearings require the disjointing of the drill stem into individual pipe sections, and when it is considered that the stem may be up to eight thousand feet or more in length, it will be seen that the time consumed in such an operation represents a considerable cost item.

Therefore, it is another object of my invention to provide a bearing wherein the bearing elements may be replaced without breaking the "stand" into sections. This may be accomplished without removing from the stem those elements which are depended upon for holding the bearing against movement longitudinally along the stem.

The novel association of parts which allows the above may be characterized as a plurality of bearing elements movable transversely of the stem into and out of a group association in which they encircle the stem, together with a member which is adjustable longitudinally of the stem into and out of a position holding the elements against transverse separative displacement. In the instant application, this feature is claimed broadly, as is also the segmental characteristic of the carirer upon which the bearing elements are mounted. Certain of the broader claims which include the segmental characteristic of the carrier, specify that the means holding the segments against transverse displacement are provided on and adjustable longitudinally along the stem into and out of engagement with said segments near their adjacent ends.

In a copending application filed by me under even date herewith and entitled "Drill stem bearing (No. 5651)" Ser. No. 430,610 I have shown a bearing having a carrier with the segmental characteristics mentioned above, but in that case I have specified and claimed the means releasably holding the segments against transverse separative movement as comprising inter-engaging parts on the segments themselves, the parts being engageable and disengageable by virtue of relative longitudinal movement of the segments. In that application I have also claimed specifically the bearing elements in the form of sleeves made up of a plurality of segments, irrespective of the particular means for holding the segments against separative displacement; whereas in the present application I have drawn claims specifically to a particular mounting of roller bearing elements, irrespective of the type of segment-holding means employed.

The general objects of the present invention may be summed up as the provision of an efficient drill stem bearing which is relatively simple and sturdy of construction, relatively cheap and easy to manufacture, assemble and install, and which has such characteristics that it effectively resists the various displacement and other strains to which it is exposed. More particular objects and features of novelty will be made apparent in the following detailed description, in which:

Figure 1 is an elevation showing an embodiment of my invention applied to a drill stem within a conventional casing, the bearing being broken away at one side to show its cross-sectional characteristics;

Fig. 2 is a fragmentary section taken on the broken line 2—2 of Fig. 1;

Fig. 3 is a fragmentary elevation, partly in section, generally similar to Fig. 1 but showing a variation form of bearing element; and Fig. 4 is a reduced section on line 4—4 of Fig. 3 but showing completely the annular characteristics of the various elements.

Numeral 10 designates a section of usual tubular drill stem which is mounted in the usual manner (not shown) for rotation within well casing 11, the relative diameters of stem and casing being such that appreciable annular clearance 12 is left therebetween. Circulation fluid which passes through the bore of stem 10 is adapted to pass through the tool (not shown) at the lower end of the stem and thence upwardly through space 12, for reasons well known to those skilled in the art.

Numeral 10' indicates a fragment of a usual coupling or tool joint whereby stem section 10 is coupled to the adjacent stem section (not shown), and the drill stem bearing generally indicated at 13 will ordinarily be applied to section 10 adjacent coupling 10'. However, it will be made apparent that the means for positioning the bearing longitudinally on the stem is such that it may be applied with equal effectiveness at any point between stem couplings.

Bearing 13 includes an annular carrier or cage 14 which is made up of a plurality of symmetrical segments 15. In the embodiment shown, these segments are two in number and therefore semi-circular, but it will be understood the invention contemplates broadly the provision of any desirable number of segments. The segments are adapted to be moved transversely of the stem into and out of encircling association therewith, and when in such association the carrier may be considered as made up of two rings 16 which are spaced apart longitudinally of the stem and held in axial alinement by longitudinally extending and angularly spaced ribs 18.

The bearing elements carried by carrier 14 may be of any suitable type, those in Fig. 1 being rubber rollers 19 having axial pin ends 20. They are mounted for rotation in the following manner. Cut into rings 16 between ribs 18 are the angularly spaced recesses 21, the recesses in the two rings being axially alined and opening both to the inner peripheral faces 22 of the rings and towards the opposed end faces 23 thereof. Pin ends 20 normally lie in these recesses and when segments 15 are detached from the stem, rollers 19 are bodily movable transversely of said segments into and out of mounted position, due to the inward opening of the recesses. Recesses 21 have such radial extent that when the carrier is applied to the stem, they will accommodate movement of the pin ends radially with respect to the stem and hence allow what may be termed limited bodily movement of the rollers transversely of or radially with respect to the stem. Accordingly, surface irregularities of stem 10 which would otherwise tend to spring the rollers or impose undesirable radial thrust on ends 20 and the rearward walls of recesses 21, are accommodated by bodily movement of the rollers with a consequent elimination of such bending or side thrust effects, all to obvious advantage.

It is necessary, of course, that the segmental cage or carrier 14 be held both in assembly or encircling association with the stem and also that it be held against other than limited movement longitudinally of said stem. The means I employ for accomplishing these ends are such that the bearing may be applied with equal advantage at any point along the stem and irrespective of stem surface irregularities, and at the same time such means do not interfere with the bodily rotation or "free floating" of the carrier and bearing elements about the stem.

I provide removable duplicate keeper and positioning assemblies 24 on stem 10 at opposite ends of carrier 14, these assemblies being individually adjustable along and settable to said stem. Due to their capacity for individual adjustment, these keeper assemblies may be tightly and accurately clamped to the stem even though the drill stem may be of different diameters at the points of application. Furthermore, due to this individual adjustability, it is possible to employ the same set of keeper assemblies to accommodate carriers of different longitudinal extent.

Each assembly 24 includes a split ring 25 which is adapted to be compressed radially about the pipe to hold it in tight frictional engagement therewith, said ring having an externally threaded portion 26 and a contiguous conical portion 27 having external inclined or wedge face 28. Slidable over conical portion 27 is clamp ring 29 having a bore portion 30 of tapering characteristics complementary to that of portion 27 whereby movement of the clamping ring longitudinally over the split ring in one direction tends to compress the latter radially and thus clamp it on the stem in the position to which it has been adjusted longitudinally therealong.

As a means for thus moving the clamp ring, I employ a nut 31 on the threaded portion 26 of ring 25, the nut also tending to hold the clamping ring releasably in clamping position. As is made evident in Fig. 3, nut 31 and clamp ring 29 may be integral, but it is preferable that they be separate as shown in Fig. 1 so the wedge ring need not be rotated over the split ring during rotation of the nut.

The opposed faces 40 of annular keeper flanges 32 extend radially over the ends of rings 16 and thus serve to limit movement of carrier 14 and hence of rollers 19 longitudinally of the stem. Faces 40 additionally function to hold the carrier segments against transverse separative displacement by reason of the fact that they longitudinally overlap the segments near their adjacent ends. Thus, the underside of each flange 32 is under-cut to form an annular, V-shaped recess 41 (of which face 40 is a defining wall) taking the conical end 34 of the associated ring 16. It will be readily seen that due to overhanging of the keeper ring flange with respect to the ends of the carrier ring segments, such segments are held from movement transversely outward with respect to the stem. It is obvious, of course, that the overlap need not be of the conical characteristics shown in order to bring about this releasable retention of the carrier segments by the keeper, but it is preferable in-as-much as it is the result of a relatively simple machining operation with minimum weakening of parts, and also for the reason that the exposed conical faces of the carrier ring ends present minimum chance of the bearing "hanging-up" as they pass through casing joints, as will be readily understood by those skilled in the art. For the same reason, the ends 35 of rollers 19 are preferably slightly coned.

It will be seen that rings 29 each have three fold function, namely, they clamp split rings 25 to stem 10; they hold the carrier segments in encircling association with the stem, and they limit the movement of carrier 14 longitudinally of stem 10.

The proportion and adjustment of the several parts of the bearing assembly are such that there is annular clearance between rings 16 and 29, and also a capacity for slight end play of the carrier assembly between the opposed shoulders of flanges 32. Consequently, the cage or carrier is free to "float" about stem 10 and thus allows maximum efficiency to rollers 19. The bodily radial play of rollers 19 possible because of the radial extent of recesses 21 not only gives to the bearing the advantages enumerated above, but also allows for compression and wear of the rollers.

If occasion arises for replacing rollers 19, it is necessary only to loosen one nut 31 and slide the associated keeper 29 over its ring 25 until its overhanging flange clears the end 34 of carrier 14, whereupon the carrier segments may be lifted clear of the opposite recess 41 and parted transversely from stem 10. With the carrier thus disassembled, the worn rollers 19 may be lifted out through recesses 21, and replaced with new rollers. Thereupon, the carrier segments are again set in position about the pipe and nut 31 screwed downwardly to return keeper 29 to its original position, care being taken to maintain the clearances mentioned above.

In order that the flow of circulating fluid upwardly about stem 10 may not be seriously interfered with by the bearing assembly, the ring portions 16 of the carrier are peripherally notched or recessed as at 36 in radial alinement with ribs 18 and hence between rollers 19. The circulation water may then course upwardly through notches or ways 36 and between rollers 19.

In Figs. 3 and 4 I have shown a variation in the form of bearing element. With the exception of this and one other variation, the elements of the bearing are the same and operate precisely as do the similar elements shown in Figs. 1 and 2. I have therefore numbered the elements in Figs. 3 and 4 identically with similar elements in Figs. 1 and 2 but with the addition of the exponent "a". The other variation mentioned above lies in the showing of the integral make up of the keeper and nut, the single, combined member being indicated at 29a—31a.

The sectional portion of Fig. 3 is taken on a line extending radially through one of the ribs 18a in counterdistinction to the sectional portion of Fig. 1 which is taken along a line intermediate two adjacent ribs. In Figs. 3 and 4, the bearing elements 19a are in the form of segments, one for each carrier segment, which, when carrier 14a is assembled, are associated to form a sleeve 19b about and in peripheral engagement with stem 10a. The sleeve segments which go to make up this annular bearing ring 19b are mounted individually on the several carrier segments and are preferably formed by casting or moulding the rubber about ribs 18 so as to extend radially there-beyond on both sides and preferably extending longitudinally to the opposed ring faces 23a, which faces thus serve to hold the bearing segments positively against shifting longitudinally along the carrier segments. The carrier segments may be considered not only as providing projections to be taken by the keeper rings, but also as internal reinforcements or armatures for the rubber segments. If desired, sleeve segments 19a may be externally and longitudinally fluted to provide water courses 36a preferably in line with recesses 36, to permit the upward flow of circulating fluid therethrough in the event the sleeve has relatively close fit in the casing.

It will be evident that the split rings 25a and retaining rings 29a operate precisely as do the similar elements of Fig. 1 and also that the same clearances between carrier and keeper exist. The bearing element assembly thus has the same capacity for "floating" or for free bodily rotation about the stem, as in the case previously described.

It will be understood that the drawing and description are to be considered merely as illustrative of and not restrictive on the broader claims appended hereto, for various changes in design, structure and arrangement may be made without departing from the spirit and scope of said claims.

I claim:

1. In a bearing for drill stems or the like, a carrier adapted to encircle the stem and embodying a plurality of segments, a bearing element carried by each segment, said segments being movable transversely of the stem into and out of encircling association therewith, and a member on and adjustable longitudinally along the stem into and out of engagement with said segments near their adjacent ends and adapted, when in such engagement, to hold said ends against transverse separative displacement.

2. In a bearing for drill stems or the like, a carrier adapted to encircle the stem and embodying a plurality of segments, a bearing element carried by each segment, said segments being movable transversely of the stem into and out of encircling association therewith, and a pair of members on the stem, one near each end of the carrier, said members being individually adjustable longitudinally along the stem into and out of engagement with said segments at their opposite ends and adapted, when in such engagement, to hold the associated ends of the segments against transverse separative displacement.

3. In a bearing for drill stems or the like, a carrier adapted to encircle the stem and embodying a plurality of segments, a bearing element carried by each segment, said segments being movable transversely of the stem into and out of encircling association therewith, a member on and adjustable longitudinally along the stem into and out of engagement with said segments near their adjacent ends and adapted, when in such engagement, to hold said ends against transverse separative displacement, and releasable means for holding said member in adjusted position on said stem.

4. In a bearing for drill stems or the like, a carrier adapted to encircle the stem and embodying a plurality of segments, a bearing element carried by each segment, said segments being movable transversely of the stem into and out of encircling association therewith, a pair of members on the stem, one near each end of the carrier, said members being individually adjustable longitudinally along the stem into and out of engagement with said segments at their opposite ends and adapted, when in such engagement, to hold the associated ends of the segments against transverse separative displacement, and releasable means associated with each member adapted to hold the associated member in adjusted position on said stem.

5. In a bearing for drill stems or the like, a carrier adapted to encircle the stem and embodying a plurality of segments, a bearing element carried by each segment, said segments being movable transversely of the stem out of encircling association with the stem, and a member adjustable longitudinally of the stem into and out of a position longitudinally overlapping the segments near their adjacent ends, and adapted, when in such overlapping relation, to hold said ends against transverse separative displacement.

6. In a bearing for drill stems or the like, a carrier adapted to encircle the stem and embodying a plurality of segments, a bearing element carried by each segment, said segments being movable transversely of the stem out of encircling association with the stem, and a pair of members on the stem, one near each end of the carrier, said members being individually adjustable longitudinally of the stem into and out of positions longitudinally overlapping the adjacent ends of the segments and adapted, when in such overlapping relation, to hold said ends against transverse separative displacement.

7. In a bearing for drill stems or the like, an annular carrier adapted to encircle the stem and embodying a plurality of segments, a bearing element carried by each segment, said segments being movable transversely of the stem into and out of encircling association therewith, and a pair of releasable means on the stem and engageable with the opposite ends of the segments to hold said segments in such association with the stem; said bearing elements engaging the stem peripherally between said pair of holding means.

8. In a bearing for drill stems or the like, a carrier adapted to encircle the stem and embodying a plurality of segments, a bearing element carried by each segment, said segments being movable transversely of the stem into and out of encircling association therewith, and a member on and adjustable longitudinally along the stem into and out of engagement with said segments near their adjacent ends and adapted, when in such engagement, to hold said ends against separative displacement.

9. In a bearing for drill stems or the like, a carrier adapted to encircle the stem and embodying a plurality of segments, a bearing element carried by each segment, said segments being movable transversely of the stem into and out of encircling association therewith, and a pair of members on the stem, one near each end of the carrier, said members being individually adjustable longitudinally along the stem into and out of engagement with said segments at their opposite ends and adapted, when in such engagement, to hold the associated ends of the segments against separative displacement.

10. In a bearing for drill stems or the like, a carrier adapted to encircle the stem and embodying a plurality of segments, said segments being movable transversely of the stem into and out of encircling association therewith, releasable means engageable with the segments to hold them in such association with the stem, and a bearing element removably and rotatably mounted in one of the segments, said element being bodily movable transversely of the segment into and out of mounted position when said segment is separated from the stem.

11. In a detachable bearing for drill stems or the like, an annular carrier adapted to encircle the stem, said carrier embodying a pair of rings, means connecting and spacing said rings apart longitudinally of the stem, there being axially alined bearing recesses cut in said rings and opening to the inner peripheral faces and also towards the opposed end faces thereof, a bearing roller having axial pin ends, said roller being bodily movable transversely of its axis, when said carrier is detached from the stem, into a position between said rings and with its pin ends extending into said recesses.

12. In a bearing for drill stems or the like, an annular carrier encircling the stem and embodying a pair of rings spaced apart longitudinally of the stem and held against relative rotation, there being axially alined bearing recesses in said rings, which recesses open to the inner peripheral faces of the rings, and a roller extending between and having end bearing in said recesses, said recesses extending radially of the rings whereby the roller is limitedly bodily movable radially of the rings towards and away from the stem.

13. In a bearing for drill stems or the like, an annular carrier adapted to encircle the stem, the carrier being annularly spaced from the stem, a bearing element on the carrier and adapted to engage the stem and projecting radially outward beyond the carrier, and means applied to the stem at opposite ends of the carrier to position the carrier longitudinally of the stem, said means being individually adjustable longitudinally along the stem.

14. In a bearing for drill stems or the like, an annular carrier adapted to encircle the stem, the carrier being rotatable about the stem, a bearing element on the carrier and adapted to engage the stem and projecting radially outward beyond the carrier, a pair of carrier positioners applied one each to the stem at opposite ends of the carrier and individually adjustable longitudinally along the stem, said positioners each embodying a split ring encircling the stem, and releasable means for compressing the ring radially about the stem.

15. In a bearing for drill stems or the like, an annular carrier adapted to encircle the stem, the carrier being rotatable about the stem, a bearing element on the carrier and adapted to engage the stem and projecting radially outward beyond the carrier, a pair of carrier positioners applied one each to the stem at opposite ends of the carrier and individually adjustable longitudinally along the stem, said positioners each embodying a split ring encircling the stem, and releasable means for compressing the ring radially about the stem, said releasable means having a portion adjacent to and extending radially outward into overlapping relation with the end of the carrier, and the carrier being normally capable of rotation with respect to said positioners.

16. In a bearing for drill stems or the like, an annular carrier adapted to encircle the stem, the carrier being annularly spaced from the stem, a bearing element on the carrier and adapted to engage the stem, and means applied to the stem at opposite ends of the carrier to position the carrier longitudinally of the stem, said means each embodying a split ring encircling the stem, said ring having an externally threaded portion and a conical portion, a clamping ring having a conical bore portion substantially complementary to and taking the conical portion of the ring, a nut on the threaded portion and in end engagement with the clamping ring whereby movement of the nut in one direction moves the clamping ring over the conical portion of the split ring in a manner to compress the latter radially about the stem; and a shoulder on said clamping ring adjacent to and extending radially over the end of the carrier.

17. In a bearing for drill stems or the like, an annular carrier adapted to encircle the stem, the carrier being annularly spaced from and rotatable about the stem, a bearing element on the carrier and adapted to engage the stem and projecting radially outward beyond the carrier, and means applied to the stem at one end of the carrier to limit movement of the carrier in one direction longitudinally of the stem, said means embodying a ring encircling and applied directly to the stem and adjustably held against movement longitudinally therealong.

18. In a bearing for drill stems or the like, a carrier adapted to encircle the stem and embodying a plurality of segments, a bearing element carried by each segment, said segments being movable transversely of the stem into and out of encircling association therewith, and means on and adjustable longitudinally along the stem into and out of engagement with segments near their adjacent ends and adapted, when in such engagement, to hold said ends against transverse separative displacement; said means embodying a split ring encircling the stem and radially compressible thereabouts to hold it in adjusted position longitudinally of the stem, and a keeper ring movable over the split ring into and out of engagement with said segments near their adjacent ends and adapted, when in such engagement, to hold said ends against transverse separative displacement.

19. In a bearing for drill stems or the like, a carrier adapted to encircle the stem and embodying a plurality of segments, a bearing element carried by each segment, said segments being movable transversely of the stem into and out of encircling association therewith, and means on and adjustable longitudinally along the stem into and out of engagement with said segments near their adjacent ends and adapted, when in such engagement, to hold said ends against transverse separative displacement; said means embodying a split ring encircling the stem and radially compressible thereabouts to hold it in adjusted position longitudinally of the stem, and a keeper ring movable over the split ring so to compress it and also being movable over the split ring into and out of engagement with said segments near their adjacent ends and adapted, when in such engagement, to hold said ends against transverse separative displacement.

20. In a device for positioning bearings on drill stems, a split ring adapted to encircle the pipe and to be tightly radially compressed thereabout, said ring having an externally threaded portion and a conical portion, a clamping ring mounted on said conical portion for movement axially thereof in a manner whereby such movement in one direction radially compresses the split ring, and a nut on said threaded portion and in end face engagement with the clamping ring whereby screw-thread movement of said nut in one direction moves said clamping ring in said one direction.

21. In a device for positioning bearings on drill stems, a split ring adapted to encircle the pipe and to be tightly radially compressed thereabout, said ring having an externally threaded portion and a conical portion, a clamping ring mounted on said conical portion for movement axially thereof in a manner whereby such movement in one direction radially compresses the split ring, and a nut on said threaded portion and in end face engagement with the clamping ring whereby screw-thread movement of said nut in one direction moves said clamping ring in said one direction, there being an annular recess in said clamping ring, which recess faces oppositely with respect to said end with which the nut engages.

22. In a device of the character described, a bearing element carrier embodying a pair of ring segments, angularly spaced ribs connecting said segments and maintaining them in spaced and axially alined relation, there being axially alined recesses cut in said segments between said ribs and opening both to the inner peripheral faces and towards the opposed end faces of said segments.

23. In a bearing for drill stems or the like, a plurality of bearing elements grouped to encircle the stem and movable transversey of the stem into and out of such group association, said elements being bodily rotatable about the stem, and an annular member adjustable longitudinally of the stem into and out of a position holding said elements against transverse separative displacement but allowing their rotation about the stem.

24. In a bearing for drill stems or the like, a plurality of bearing elements grouped to encircle the stem and movable transversely of the stem into and out of such group association, said elements being bodily rotatable about the stem, and an annular member removably settable directly on the stem in a position holding said elements against transverse separative displacement.

25. In a bearing for drill stems or the like, a plurality of bearing elements grouped to encircle the stem and movable transversely of the stem into and out of such group association, said elements being bodily rotatable about the stem, and a pair of annular members removably mounted directly on the stem and individually settable in positions holding said elements against transverse separative displacement.

26. In a bearing for drill stems or the like, an annular carrier adapted to encircle the stem, the carrier being annularly spaced from and rotatable about the stem, a bearing element on the carrier and adapted to engage the stem and projecting radially outward beyond the carrier, and means applied to the stem at opposite ends of the carrier to position the carrier longitudinally of the stem, the carrier being rotatable with respect to said means.

27. In a bearing for vertical drill stems or the like, a carrier adapted to encircle the stem in annularly spaced relation with respect thereto and embodying a plurality of segments, a segmental bearing element on each segment and extending beyond the opposite peripheral faces thereof, the upper and lower ends of the carrier segments extending vertically beyond the upper and lower ends of the associated bearing segments, and releasable means applied to the stem and engaging said carrier-segment ends to hold them against separative displacement.

28. In a bearing for vertical drill stems or the like, a carrier adapted to encircle the stem in annularly spaced relation with respect thereto and embodying a plurality of segments, means releasably holding said segments against separative displacement from about the stem, and a segmental bearing element on each segment and extending beyond the opposite peripheral faces thereof, the inner peripheral faces of the elements engaging the stem, and the several bearing elements being adjacent one another whereby together they form a substantially closed bearing ring about the stem.

29. A bearing element for drill stems embodying a rubber sleeve, and rigid internal reinforcement in the sleeve, said reinforcement comprising angularly spaced bars extending through the sleeve in substantial parallelism with the sleeve axis, and means rigidly connecting said bars and holding them in said spaced relation, said connecting means extending longitudinally of the sleeve beyond an end thereof.

In witness that I claim the foregoing I have hereunto subscribed my name this 31st day of January 1930.

JAMES J. SANTIAGO.